United States Patent [19]
Lesinski

[11] 3,806,249
[45] Apr. 23, 1974

[54] METHOD OF MEASUREMENT OF COLOR TEMPERATURE AND A DEVICE FOR CARRYING OUT SAID METHOD

[75] Inventor: Jacek Lesinski, Warszawa, Poland

[73] Assignee: Commissariat A L'Energie Atomique and Instytut Baden Jadrowych, Paris, France

[22] Filed: May 8, 1972

[21] Appl. No.: 251,395

[30] Foreign Application Priority Data
May 7, 1971 Poland .............................. 148013

[52] U.S. Cl. ............................... 356/45, 73/355 R
[51] Int. Cl. ................................................ G01j 5/60
[58] Field of Search ....... 73/355 EM, 355 R; 356/45

[56] References Cited
UNITED STATES PATENTS
| 3,611,805 | 10/1971 | Hishikari ...................... 356/45 X |
| 2,702,494 | 2/1955 | Lieneweg et al ..................... 356/45 |
| 2,972,282 | 2/1961 | Forsterling et al .................. 356/45 |
| 3,608,817 | 9/1971 | Svet .......................... 73/355 EM X |

FOREIGN PATENTS OR APPLICATIONS
707,105 4/1965 Canada ........................... 73/355 R Primary Examiner—Richard C. Queisser
Assistant Examiner—Frederick Shoon

[57] ABSTRACT

A beam of heat radiation emitted by a substance under study is modulated by causing the beam to pass alternately through a first colored filter and a second colored filter which permit transmission of two different colors. The beam as thus modulated is passed through an interference filter having an adjustable ratio of transmission for the two colors and then strikes a single photodetector. The interference filter is finally adjusted to a color transmission ratio such that the electric signals delivered by the photodetector and corresponding respectively to each of the two colors should be in equilibrium. After this adjustment, the interference filter provides a measurement of the temperature.

2 Claims, 3 Drawing Figures

PATENTED APR 23 1974 3,806,249

3,806,249

METHOD OF MEASUREMENT OF COLOR TEMPERATURE AND A DEVICE FOR CARRYING OUT SAID METHOD

This invention relates to a method of measurement of color temperature as well as to a device for carrying out said method.

It is known that, in some laboratory researches, it is often necessary to provide the possibility of determining the temperatures of solid substances up to the vicinity of 2,700°C. At temperatures of this order, it is generally accepted practice to adopt optical methods based on the measurement of the heat radiation of the solid substance udner study. In point of fact, it is often difficult and sometimes even wholly impossible to measure the absolute intensity of a monochromatic radiation and it is for this reason that the determination of temperatures of solid substances is often carried out by means of a measurement of color temperature. By making use of this method, the temperature to be determined can be known from the ratio of radiation intensities corresponding to two wavelengths by reason of the fact that the shape of the radiation spectrum of a substance varies with its temperature. This known method is particularly advantageous for the determination of temperatures of fine particles in suspension in a non-radiating medium, for example during spraying with a plasma torch.

Some of the known methods for the measurement of color temperature make use of two photodetectors (each intended to deliver a signal corresponding to one of the two wavelengths). Other known methods are based on the use of a single photodetector and consist in carrying out a modulation of the heat-radiation beam emitted by the substance under study by causing said beam to pass alternately through a first movable filter and a second movable filter; these two filters have different colors and can in particular be interference filters.

The heat-radiation beam which is thus modulated is received by the single photodetector which produces a train of electric signals and the quotient of thee amplitudes of these signals, after conversion by means of an electronic device, provides the indication of the temperature which is sought.

In actual fact, an electronic device of this type is both costly and complex (provision must be made in particular for highly stable logarithmic amplifiers) and, in the final analysis, offers low reliability of operation. Moreover, in the case in which the atomic or molecular spectra are superimposed on the constant heat radiation of the substance under study, errors are liable to occur and can be prevented only by a suitable choice of the pass-band of colored filters. However, it proves difficult in practice to design a colored filter for a well-determined pass-band, especially in the case of a very narrow band.

The method according to the inventio overcomes these various disadvantages since it does not call for the use of a complex electronic system and facilitates the choice of pass-bands of the filters employed.

This method is also a method of temperature determination of a substance by means of a measurement of color temperature, in which a single photodetector is employed. The method is particularly well suited to the case in which the heat radiation of the object under study at high temperature is of low value.

The method in accordance with the invention is distinguished from the single-photodetector methods of the prior art by the fact that the temperature to be determined is provided, not by the signals of the photodetector, but by adjustment of an interference filter. This is in actual fact a zero method.

More precisely, the invention is directed to a method of measurement of color temperature which essentially consists in modulating the beam of heat radiation emitted by the substance under study by causing said beam to pass alternately through a first colored filter and a second colored filter which permit the transmission of two different colors, in receiving said beam as thus modulated on an interference filter having an adjustable ratio of transmission for said two colors, in receiving the beam which emerges from said interferential filter on a single photodetector and finally in adjusting said interference filter to a ratio of color transmission such that the electric signals delivered by said photodetector and corresponding respectively to each of the two colors should be in equilibrium, the temperature to be determined being provided by the filter after said filter has thus been adjusted.

The invention also relates to a device for carrying out said method.

Adjustment of the interference filter can advantageously be performed by means controlled by the electric signals which are delivered by said photodetector.

Further characteristic features and advantages of the invention will become apparent from the following description in which one embodiment of the device according to the invention is given by way of explanation without any limitation being implied, reference being made to the accompanying drawings, in which.

Figure 1:
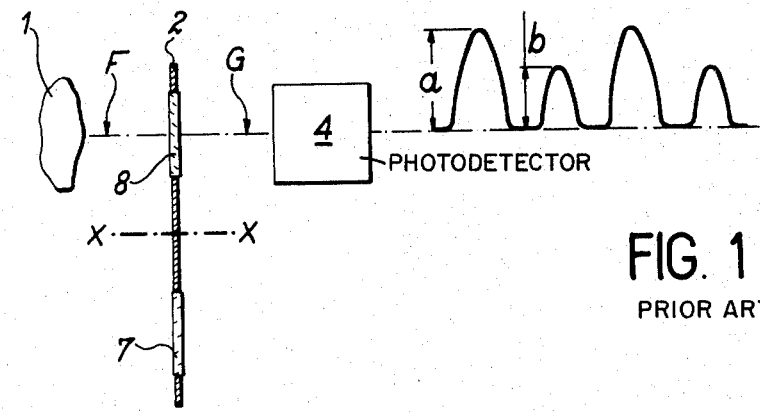
FIG. 1 is a diagrammatic view of a known device for the measurement of color temperature which makes use of a single photodetector.
Figure 2:
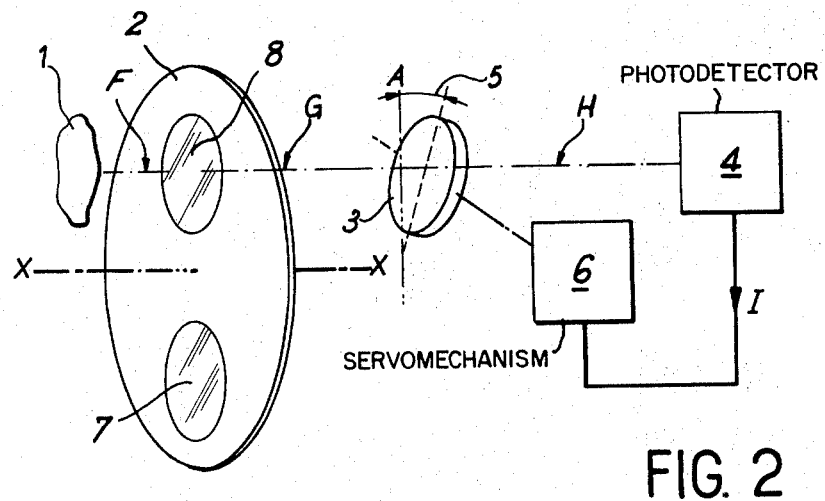
FIG. 2 is a diagrammatic view of the device for the measurement of color temperature in accordance with the invention.

The corresponding elements of FIGS. 1 and 2 are designated by the same reference numerals.

The principle of the known device shown in FIG. 1 is as follows:

a. The heat radiation beam F emitted by the substance 1 under study is modulated by causing said beam to pass alternately through a filter 7 and a filter 8 which are carried by a movable plate 2; these filters have different colors and can be interference filters.

b. The modulated beam G strikes a single photodetector 4.

c. Said photodetector produces a train of electric signals and, after conversion by means of an electronic device (not shown), the quotient $a/b$ of the amplitudes $a$ and $b$ of said signals provides the temperature which was to be determined.

The device in accordance with the present invention and as illustrated in FIG. 2 operates as follows:

a. The heat radiation beam F which is emitted by the substance 1 under study is modulated by causing it to pass alternately through a filter 7 and a filter 8 which are carried by a movable plate 2 which rotates about an axis X—X; these filters permit the passage of two different colors and can be interference filters.

b. The beam which has thus been modulated (beam G) is received on an interference filter 3 which is essentially characteristic of the invention and has an adjustable transmission ratio for these two colors.

c. The beam H which passes out of said interference filter 3 strikes the single photodetector 4.

d. The interference filter 3 is adjusted to a color transmission ratio such that the electric signals delivered by the photodetector 4 and corresponding respectively to each of the two colors are in equilibrium.

Once the interferential filter 3 has been adjusted, the temperature of the substance 1 is known immediately as a result of this adjustment; this filter can, for example, be graduated in temperatures.

As an advantageous feature, the interferential filter 3 is adjusted automatically by a servomechanism 6 which is in turn controlled (reference I) by the signals delivered by the photodetector 4.

More precisely, the signal delivered by the photodetector 4 is transmitted to the servomechanism 6 which produces action in such manner that the interference filter 3 which is characteristic of the invention is oriented at an angle 5 such that the alternate components of the photodetector signal are nullified and this nullification takes place at the moment when the radiation intensities are equal for both wavelengths.

Figure 3:
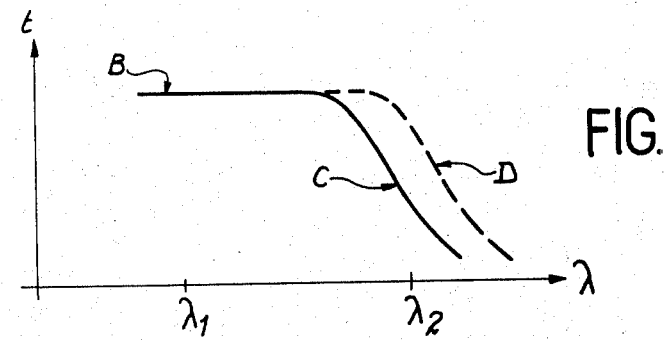
FIG. 3 represents the curve of transmission of the interference filter of the device of FIG. 2; in this curve, the abscissae correspond to the wavelengths and the ordinates correspond to the transmission factor.

The principle of this adjustment can readily be understood: when the interference filter 3 is in the vertical position (namely the position A shown in FIG. 2), the spectral characteristic (FIG. 3) is the curve BC ; when the filter 3 is rotated through a given angle, the thickness of filter (optical path) traversed by each of the two colors changes, thereby modifying the spectral characteristic, the portion C of which (corresponding to the longer wavelengths) comes into position D while the portion B (corresponding to the shorter wavelengths) remains stationary. Thus, the transmission factor t (FIG. 3) is modified in the case of λ2 and remains unchanged in the case of the wavelength λ1.

It is therefore apparent that, when the interference filter 3 undergoes a given movement of rotation (through an angle 5 as shown in FIG. 2), the radiation intensities of the two colors which have passed through the filters 7 and 8 assume the same value, with the result that their components are nullified.

By reason of the fact that the spectral characteristic curve is a function of the temperature, it is readily understood that the value of the nullification angle 5 is in turn a function of the temperature of the substance 1. This temperature can therefore be obtained by determining the value of said angle 5.

It remains wholly apparent that the foregoing description has been given solely by way of explanation without any limitation being implied and that any detail modifications can accordingly be contemplated without thereby departing either from the scope or the spirit of this invention.

What we claim is:

1. A device for determining the color temperature of a substance comprising, from the upstream end to the downstream end along the beam of heat radiation emitted by said substance, a modulator, two colored filters for said modulator for transmission of two beams of different colors, a movable support for said filters which presents said filters in alternate sequence to said beam, an interference filter in which the ratio of transmission of said two beams of different colors is adjustable by modifying the angle of inclination of said interference filter with respect to the direction of said beam of heat radiation, a photodetector receiving alternatively said two beams of different colors and generating an output signal parts of which are a function of the intensities of each colored beam received by said photodetector, electronic means for comparing said photodetector signal parts and means for adjusting the angle of inclination of said interference filter to obtain a given ratio of signal parts, said angle of inclination being an analogic measure of said color temperature.

2. A device in accordance with claim 1, wherein said mechanism for adjusting the angle of inclination of said interference filter is controlled by said electronic means.

* * * * *